United States Patent
Josephs et al.

[11] Patent Number: 6,104,172
[45] Date of Patent: *Aug. 15, 2000

[54] POWER FACTOR CORRECTOR

[75] Inventors: Louis C. Josephs, Moorpark; Robert A. Kent, Camarillo, both of Calif.

[73] Assignee: Power-One, Camarillo, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/886,644

[22] Filed: Jul. 1, 1997

[51] Int. Cl.⁷ .................................................. G05F 1/10
[52] U.S. Cl. ........................ 323/222; 323/207; 323/288
[58] Field of Search ........................ 363/89, 97; 323/222, 323/282, 288, 209, 211, 207

[56] References Cited

U.S. PATENT DOCUMENTS

| | | | |
|---|---|---|---|
| 4,683,529 | 7/1987 | Bucher, II | 363/44 |
| 4,831,508 | 5/1989 | Hunter | 363/44 |
| 5,001,400 | 3/1991 | Nilssen | 315/209 |
| 5,001,620 | 3/1991 | Smith | 363/89 |
| 5,051,685 | 9/1991 | Sink | 323/208 |
| 5,115,185 | 5/1992 | Fraidlin et al. | 323/207 |
| 5,115,347 | 5/1992 | Nilssen | 315/247 |
| 5,117,176 | 5/1992 | Bobry | 323/308 |
| 5,121,316 | 6/1992 | Rensink et al. | 363/89 |
| 5,132,606 | 7/1992 | Herbert | 323/266 |
| 5,134,355 | 7/1992 | Hastings | 323/211 |
| 5,146,396 | 9/1992 | Eng et al. | 363/16 |
| 5,180,950 | 1/1993 | Nilssen | 315/127 |
| 5,233,509 | 8/1993 | Ghotbi | 363/89 |
| 5,240,587 | 8/1993 | Maner | 205/75 |
| 5,270,913 | 12/1993 | Limpaecher | 363/140 |
| 5,283,726 | 2/1994 | Wilkerson | 363/41 |
| 5,291,119 | 3/1994 | Cowett, Jr. | 323/207 |
| 5,302,858 | 4/1994 | Folts | 307/66 |
| 5,329,439 | 7/1994 | Borojevic | 363/87 |
| 5,345,164 | 9/1994 | Lesea | 323/208 |
| 5,357,419 | 10/1994 | Limpaecher | 363/140 |
| 5,387,821 | 2/1995 | Steiciuk et al. | 307/105 |
| 5,432,695 | 7/1995 | Vlatkovic et al. | 363/138 |
| 5,434,455 | 7/1995 | Kammeter | 307/105 |
| 5,438,505 | 8/1995 | Cohen | 363/95 |
| 5,459,375 | 10/1995 | Nilssen | 315/247 |
| 5,469,045 | 11/1995 | Dove et al. | 323/211 |
| 5,508,903 | 4/1996 | Alexndrov | 363/16 |
| 5,515,261 | 5/1996 | Bogdan | 363/89 |
| 5,565,761 | 10/1996 | Hwang | 323/222 |
| 5,568,041 | 10/1996 | Hesterman | 323/207 |
| 5,598,326 | 1/1997 | Liu et al. | 363/98 |
| 5,798,635 | 8/1998 | Hwang et al. | 363/89 |

*Primary Examiner*—Shawn Riley
*Attorney, Agent, or Firm*—Lyon & Lyon LLP

[57] ABSTRACT

A power factor corrector includes a power stage that is electrically coupled to a controller. The controller is configured to receive a rectified AC voltage signal, summed with a reference level, and compare the received signal to a ramp signal. When the ramp signal exceeds the rectified AC voltage signal, the controller turns on a switch within the power stage. The switch is turned off synchronously with a periodically generated switch mode power supply drive signal.

17 Claims, 12 Drawing Sheets

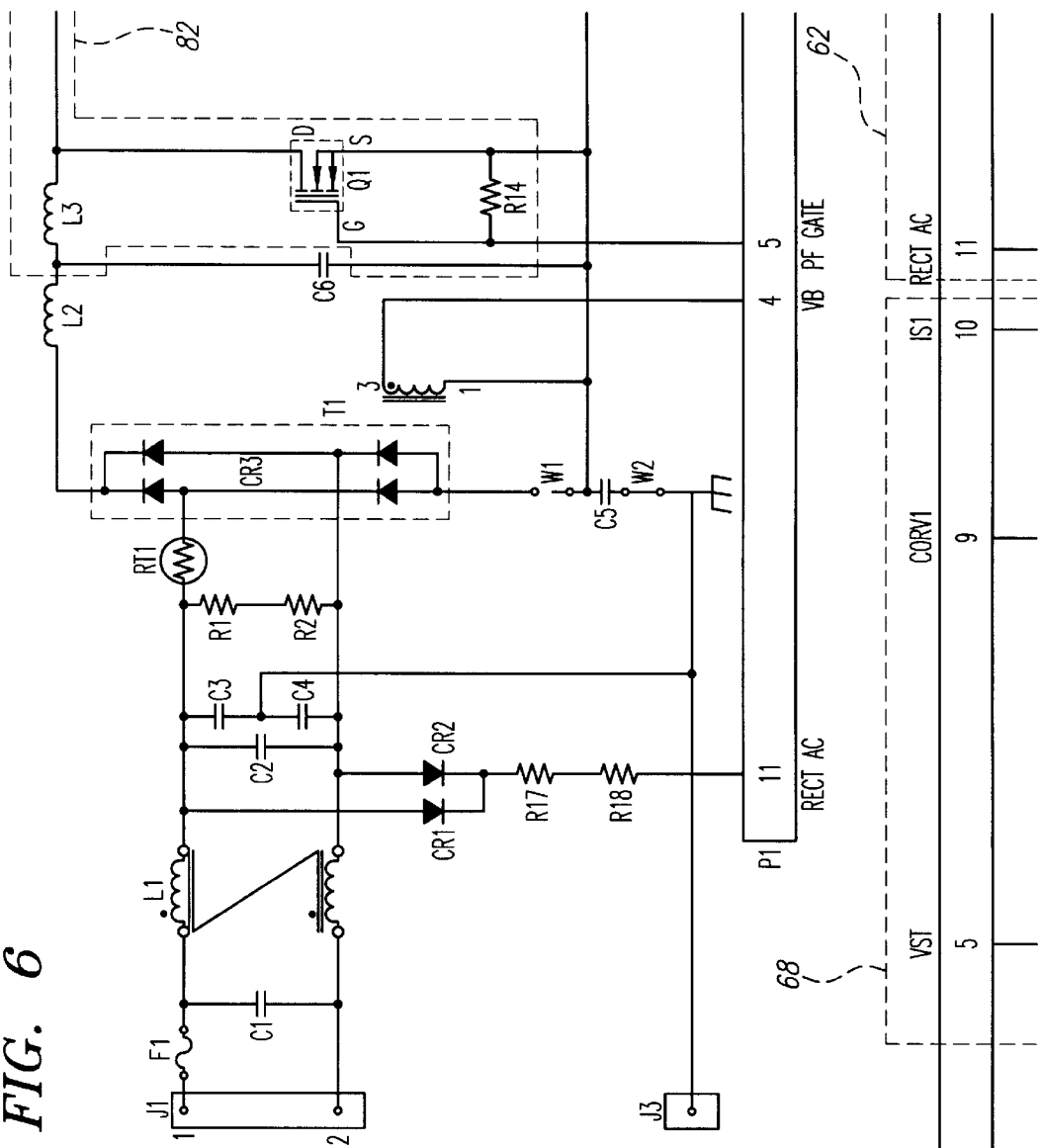

POWER FACTOR CORRECTOR

BACKGROUND OF THE INVENTION

1. Field of the Invention

The present invention pertains to the field of AC-to-DC converters, and more particularly to power factor correctors.

2. Background

A wide variety of electrically powered devices rely upon AC power for operation. Such devices include, e.g., power supplies, computers, monitors, printers, and copiers. These devices must incorporate AC-to-DC converters, which in turn must comply with standards for harmonic reduction that are set by governmental agencies. In particular, the International European Electronics Committee (IEEC) has established rigorous ceilings for harmonics in AC-to-DC converters. Therefore, such converters may be required to be equipped with harmonic reduction circuits, or power factor correctors.

Harmonic reduction is typically achieved with a boost converter circuit that is independently controlled with its own control integrated circuit (IC). Boost converter circuits are generic to the art. Their function is to draw sinusoidal or near-sinusoidal current from an AC input power line and maintain a constant supply voltage to a switch mode power supply (SMPS), which is typically pulse width modulated (PWM). These and several other types of harmonic correction circuits are well known in the art.

Conventionally, the various ICs available on the market to perform the control function for boost converter circuits have been designed to regulate the output of the boost converter so as to provide a fixed bus voltage for the SMPS, regardless of the AC input line voltage. The switch within the boost converter is controlled by a separate control IC or discrete circuitry. Completely independently of the SMPS, the boost converter control circuit senses and regulates the voltage bus. For example, U.S. Pat. No. 5,568,041, which is fully incorporated herein by reference, teaches a power factor corrector circuit and method for electronic ballasts that functions by regulating the output of the boost converter. Other references such as, e.g., U.S. Pat. No. 5,115,347, which is fully incorporated herein by reference, teach a method of switching the boost converter off above a certain line voltage.

However, such conventional control devices increase the percentage of power processed by the power stage of the power factor corrector as the AC input voltage increases and are required to process the entire power of the load. This places a stringent power requirement and component stress on the power stage. For this reason such devices require expensive components that are capable of handling the requisite stress. Additionally, such devices impose a power-factor-correction efficiency cost of seven to twelve percent reduction in total system efficiency. Thus, there is a need for a device that reduces harmonics at low cost and high efficiency.

SUMMARY OF THE INVENTION

The present invention is directed to a device that reduces harmonics at low cost and high efficiency. Accordingly, a power factor corrector has a power stage and a controller that to is electrically coupled to the power stage. The controller is configured to compare a rectified AC voltage signal with a ramp voltage signal and turn on a switch within the power stage if the ramp signal exceeds the rectified AC voltage signal.

In a first aspect of the invention, the efficiency cost for harmonic reduction, or power factor correction, is decreased by several percentage points. Preferably, component stress to a power factor corrector is minimized.

In a second, separate aspect of the invention, only a small percentage of power relative to total power input to an AC-to-DC converter is processed by a power factor corrector. The power processed by the power factor corrector is advantageously reduced as input voltage increases. Preferably, harmonics are reduced at the expense of a nonregulated power factor bus voltage.

In a third, separate aspect of the invention, a control circuit of a harmonic correction circuit receives drive signals from a controller of an SMPS. Advantageously, a separate control IC is not required for harmonic correction. A control method and mechanism for boost conversion can preferably be adapted for a wide range of SMPS topologies as a low-cost, add-on module.

In a fourth, separate aspect of the invention, generation of conducted and radiated EMI emissions in an AC-to-DC converter is reduced. A higher operating bus voltage advantageously allows for reduced bulk capacitance requirements, longer bus-capacitor life expectancy due to lower operating voltage, reduced stress on boost converter components, longer hold-up times for a lower value of capacitance, and resultant lower unit cost.

DETAILED DESCRIPTION OF THE PREFERRED EMBODIMENTS

Figure 1:
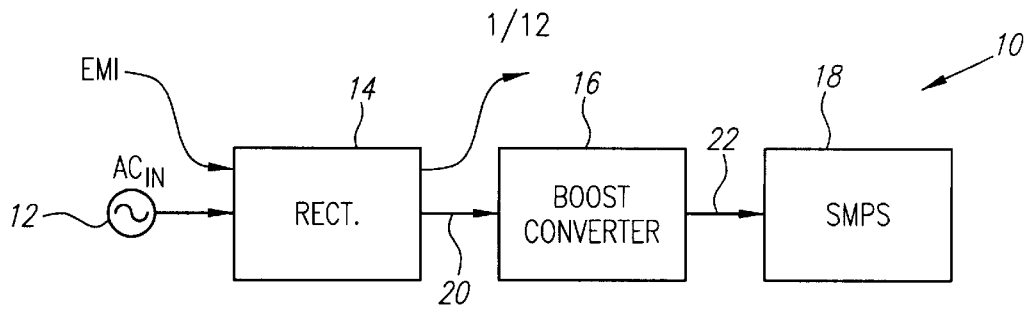
FIG. 1 is a block diagram of a conventional AC-to-DC converter driven by a conventional power factor corrector.

As illustrated in FIG. 1, a conventional AC-to-DC converter includes a rectifier circuit 14 that receives an AC voltage input signal 12. The rectifier circuit 14 is electrically coupled to a boost converter circuit, or power factor corrector 16, which receives a rectified signal 20 from the rectifier circuit 14. There may also be some EMI filtering circuitry (not shown) interposed between the rectifier circuit 14 and the boost converter circuit 16. The boost converter circuit 16 is electrically coupled to a switch mode power supply (SMPS) 18, which receives a DC signal 22 from the boost converter circuit 16. The SMPS 18 is typically pulse width modulated (PWM) at a fixed frequency to maintain output regulation. The function of the boost converter circuit 16 is to draw sinusoidal or near-sinusoidal current from the AC input line 12 and maintain a constant supply voltage 22 to the SMPS 18. Various rectifiers and boost converters are known to those of skill in the art, as illustrated in FIGS. 2–3.

Figure 2:
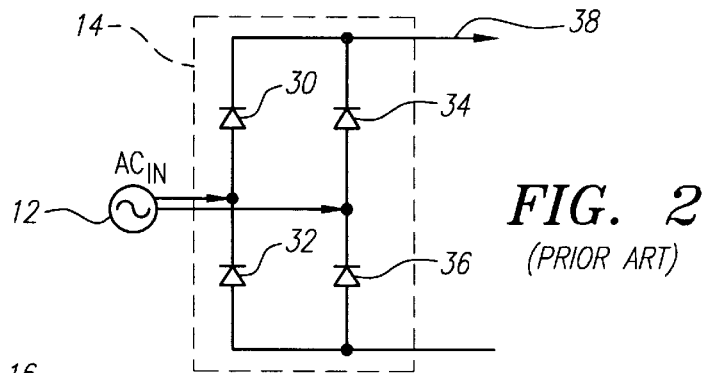
FIG. 2 is a component-level diagram of a conventional rectifier circuit used in the AC-to-DC converter of FIG. 1.

FIG. 2 shows a conventional rectifier circuit 14, shown within a dotted-line block, in which first and second diodes 30, 32 are connected in series to form a first diode pair. Third and fourth diodes 34, 36 are also connected in series to form a second diode pair. The first and second diode pairs are arranged in parallel. An AC input signal 12 is sent to a first junction, which is electrically "between" the first and second diodes 30, 32, and to a second junction, which is electrically "between" the third and fourth diodes 34, 36. The rectifier circuit 14 outputs a full wave rectified signal 38.

Figure 3:
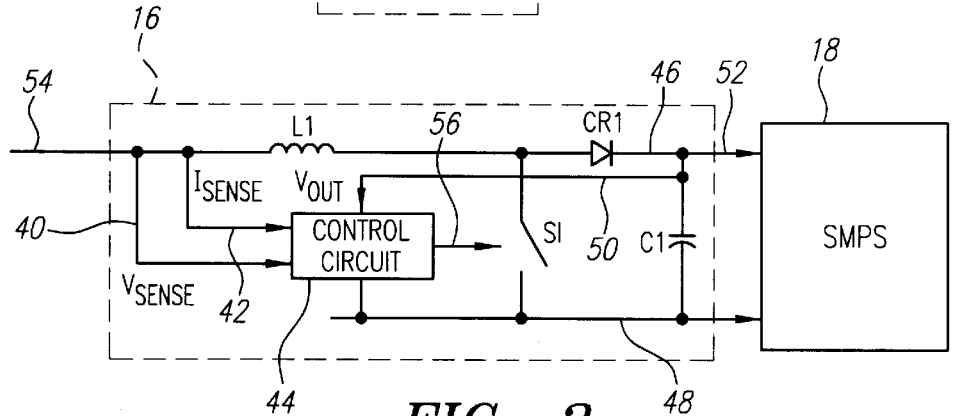
FIG. 3 is a block diagram of the conventional power factor corrector used in the AC-to-DC converter of FIG. 1.

In FIG. 3 a conventional boost converter circuit 16 is shown coupled to an SMPS 18. A voltage sense ($V_{sense}$) signal 40 and a current sense ($I_{sense}$) signal 42 are sent to a conventional control circuit 44. An inductor L1 is electrically coupled to the $V_{sense}$ signal 40 and the $I_{sense}$ signal 42. The inductor L1 is also electrically coupled in series to a diode CR1, forming a first branch 46 that is configured as an input to the SMPS 18 from the diode CR1. The SMPS 18 is also configured to receive a second input branch 48, which is coupled across the SMPS 18 to the first branch 46 through a filter capacitor C1. From a node on the first-branch-46 side of the filter capacitor C1, a voltage out ($V_{out}$) signal 50 is sent to the control circuit 44. The control circuit 44 is electrically coupled to the second branch 48, and is configured to control a switch S1, which is electrically coupled between the first and second branches 46, 48 to a node of the first branch 46 that is electrically "between" the inductor L1 and the diode CR1. A drive output 56 of the control circuit 44 controls the switch S1.

In operation the output 52 of the boost converter 16 is regulated so as to provide a fixed bus voltage 52 for the SMPS 18, regardless of the rectified input line voltage 54, which is generated by a rectifier circuit (not shown). The switch S1 is controlled by the control IC 44, several types of which are well known in the art, and which can be substituted for discrete circuitry, also known in the art, to allow the drive 56 to be completely independent of the SMPS 18. The voltage bus 46 is sensed and regulated by the control circuit 44. The power processed by the boost converter circuit 16 is the entire load requirement of the SMPS 18 load, and switching losses increase as the instantaneous AC voltage 54 is increased. It is known in the art that flyback, buck-boost, or other topologies could be substituted for the boost converter circuit 16.

Figure 4:
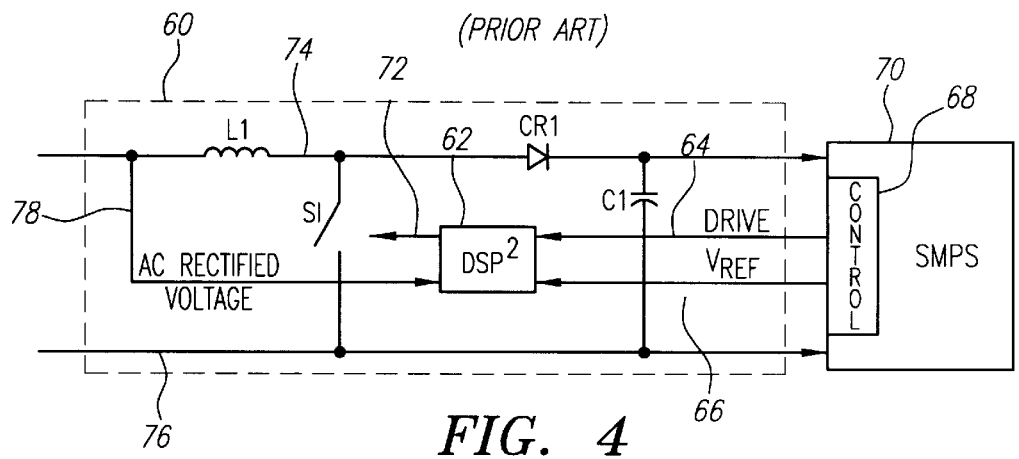
FIG. 4 is a block diagram of a power factor corrector that can be used in the AC-to-DC converter of FIG. 1.

In a particular embodiment shown in FIG. 4, a boost converter circuit 60 includes a drive signal post processor ($DSP^2$) circuit 62. The $DSP^2$ circuit 62 is configured to receive a drive signal 64 and a reference voltage ($V_{Ref}$) signal 66 from a PWM controller 68 of an SMPS 70. The $DSP^2$ circuit 62 generates an output signal 72 (denoted DRV-B in FIG. 6) that drives a switch S1, which is electrically coupled to a first branch 74 and a second branch 76. The first and second branches 74, 76 are input to the SMPS 70. The first branch 74 includes an inductor L1 and a diode CR1 that are connected in series. The switch S1 is coupled to the first branch at a first node that is in electrical contact with both the inductor L1 and the diode CR1. An AC rectified voltage input signal 78 is sent to the $DSP^2$ circuit 62 from a second node of the first branch 74, the inductor L1 being electrically coupled between the first and second nodes. A filter capacitor C1 is electrically coupled to the first branch 74 and the second branch 76, across the inputs to the SMPS 70.

Figure 7:
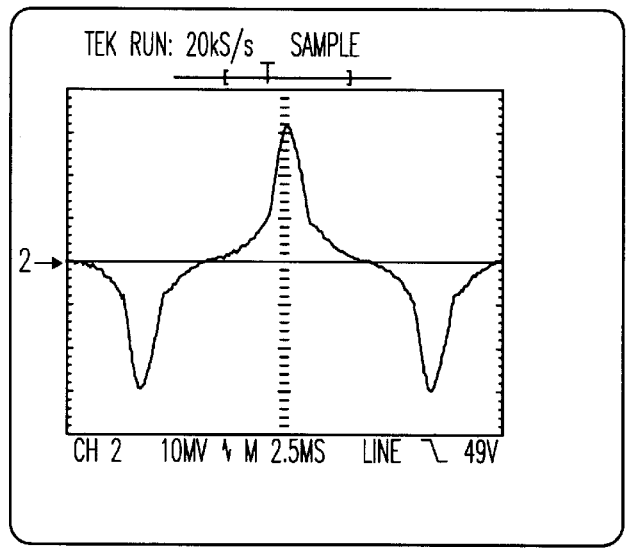
FIG. 7 is a representation of an oscilloscope screen showing AC current versus time for AC voltage equal to eighty-five volts with harmonic correction.
Figure 8:
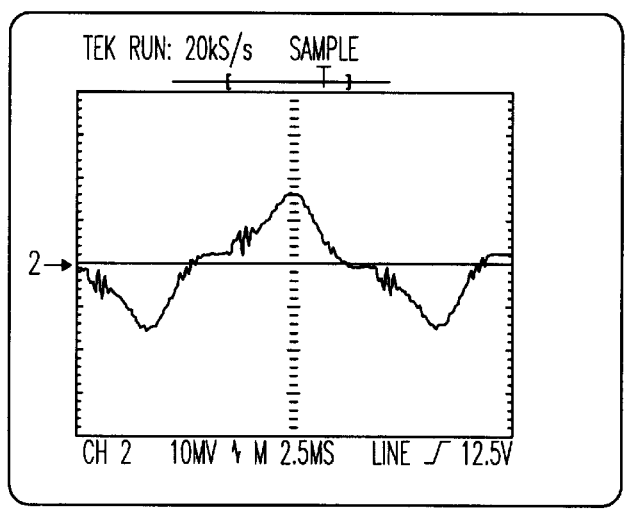
FIG. 8 is a representation of an oscilloscope screen showing AC current versus time for AC voltage equal to 230 volts with harmonic correction.
Figure 9:
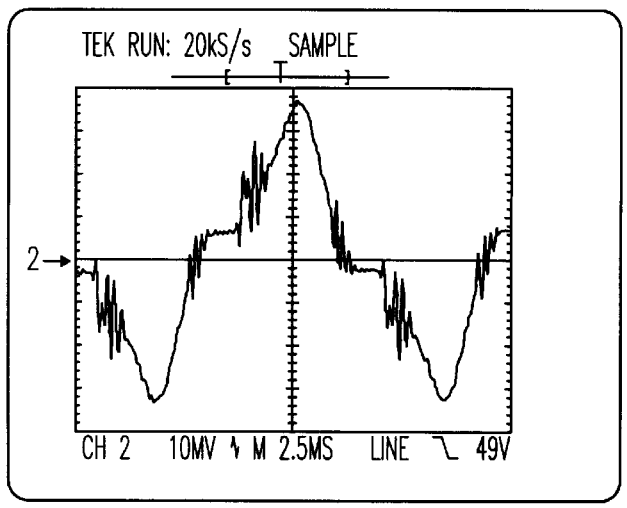
FIG. 9 is a representation of an oscilloscope screen showing AC current versus time for AC voltage equal to 264 volts with harmonic correction.

AC line current and associated current harmonics are illustrated in FIGS. 7–9. In FIG. 7 the current is shown for a measured AC voltage of eighty-five volts. In FIG. 8 the AC voltage is 230 volts, and in FIG. 9, the AC voltage is 264 volts. As can be seen, current harmonics, which are measured in milliAmps (mA) per Watt (W), increase as voltage is increased.

In a specific embodiment, such harmonics are vastly reduced. The reduction of the first through fortieth current harmonics is crucial because the harmonics are subject to ceiling standards set by governmental agencies such as the IEEC. Advantageously, in addition to yielding reduced harmonics, the control algorithm greatly reduces the power processing requirement and EMI generation for the boost converter circuit 60, thereby resulting in improved overall system efficiency and reduced EMI filtering for the AC-to DC converter.

Figure 10:
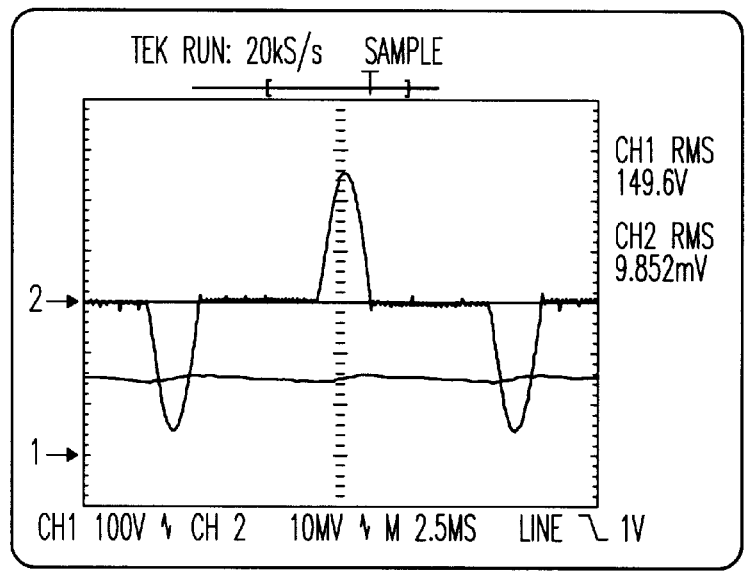
FIG. 10 is a representation of an oscilloscope screen showing output voltage versus AC current at an AC input voltage of 230 volts for an AC-to-DC converter without power factor correction.
Figure 11:
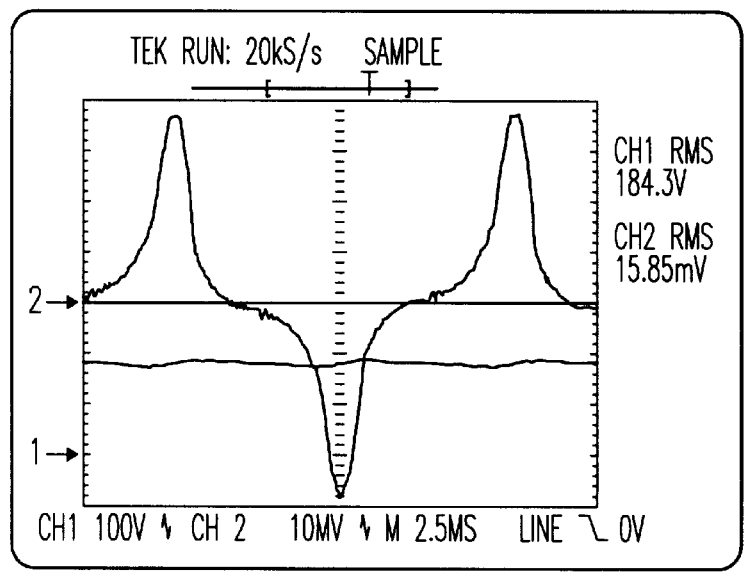
FIG. 11 is a representation of an oscilloscope screen showing output voltage versus AC current at an AC input voltage of 230 volts for an AC-to-DC converter with the power factor corrector of FIG. 4.

In the circuit of FIG. 4, the output signal 72 of the $DSP^2$ circuit 62 is a derivative of the control for the SMPS 70. The bus voltage is preferably allowed to vary with the input line voltage. The output current waveform, which is shown in FIG. 11, is not a true sine wave, but instead preferably approximates a periodic bell curve. In contrast, the output current waveform without power factor correction, which is shown in FIG. 10, approximates a periodic pulse.

Figure 5A:
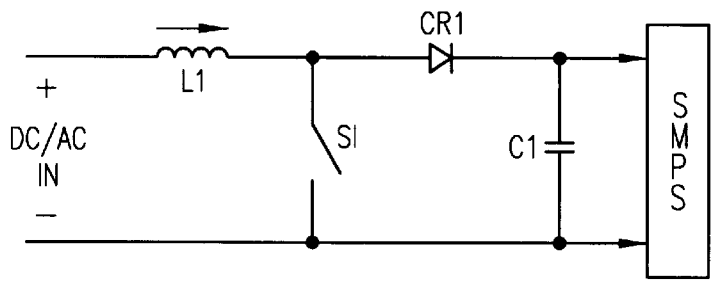
FIG. 5A is a block diagram of a generic boost converter circuit coupled to a switch mode power supply.
Figure 5B:
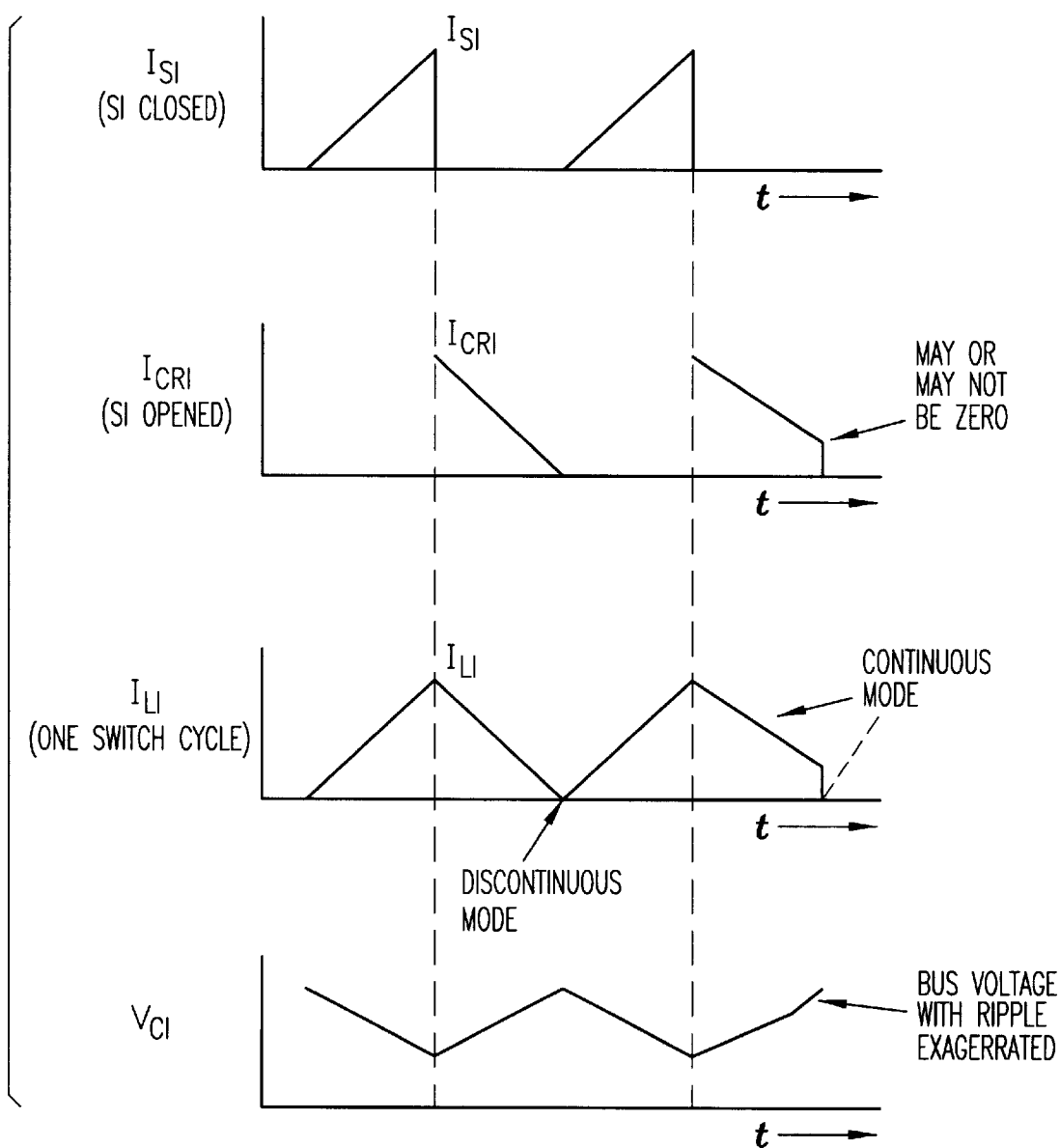
FIG. 5B is a timing diagram of various current and voltage waveforms generated by the boost converter of FIG. 5B, illustrating operation of the boost converter over one switching cycle.

The boost power stage 60 transforms the input voltage ($V_{in}$) to an output voltage ($V_{out}$) that is equal to or higher than $V_{in}$. Operation of the boost converter circuit 60 over one switching cycle is illustrated in FIGS. 5A–B. The duty cycle is defined as the ratio of "on" time of the switch S1 to the switching period. During the "on" time of the switch S1, the inductor L1 is energized. During the "off" time of the switch S1, the inductor L1 is either partially or completely de-energized through the diode CR1 and its energy is transferred either completely or partially to the bus capacitor C1. In conventional power factor correctors, the duty cycle is controlled by a separate PWM controller to obtain a regulated output voltage and provide harmonic correction. In contrast, in a particular embodiment, the duty cycle is modulated to comply with required specifications for line current harmonics and the supply voltage to the SMPS is allowed to vary as required to maintain harmonic compliance.

Figure 6B:
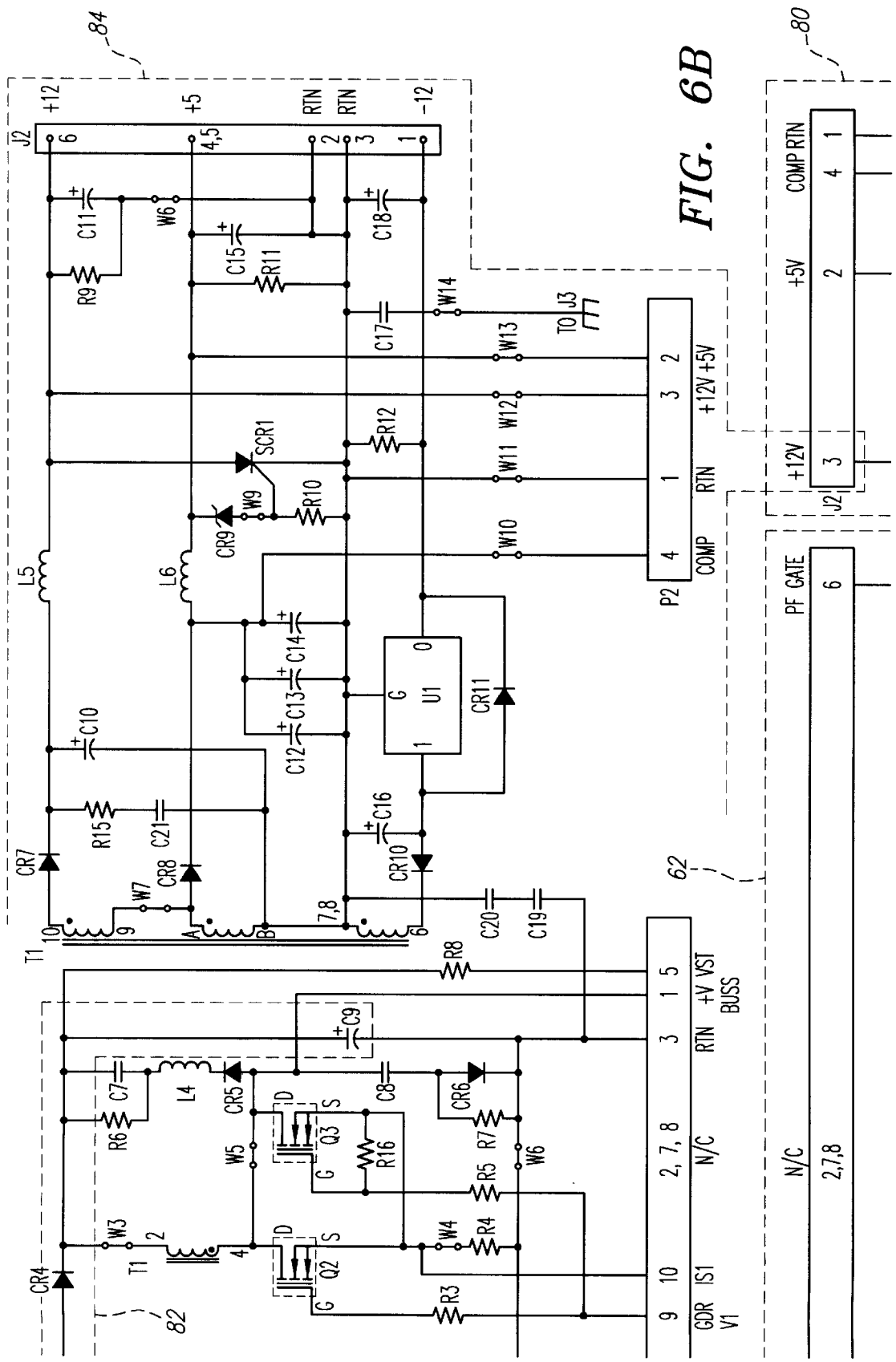
FIG. 6 is a component-level diagram of the integration between a switch mode power supply and the power factor corrector of FIG. 4.
Figure 6C:
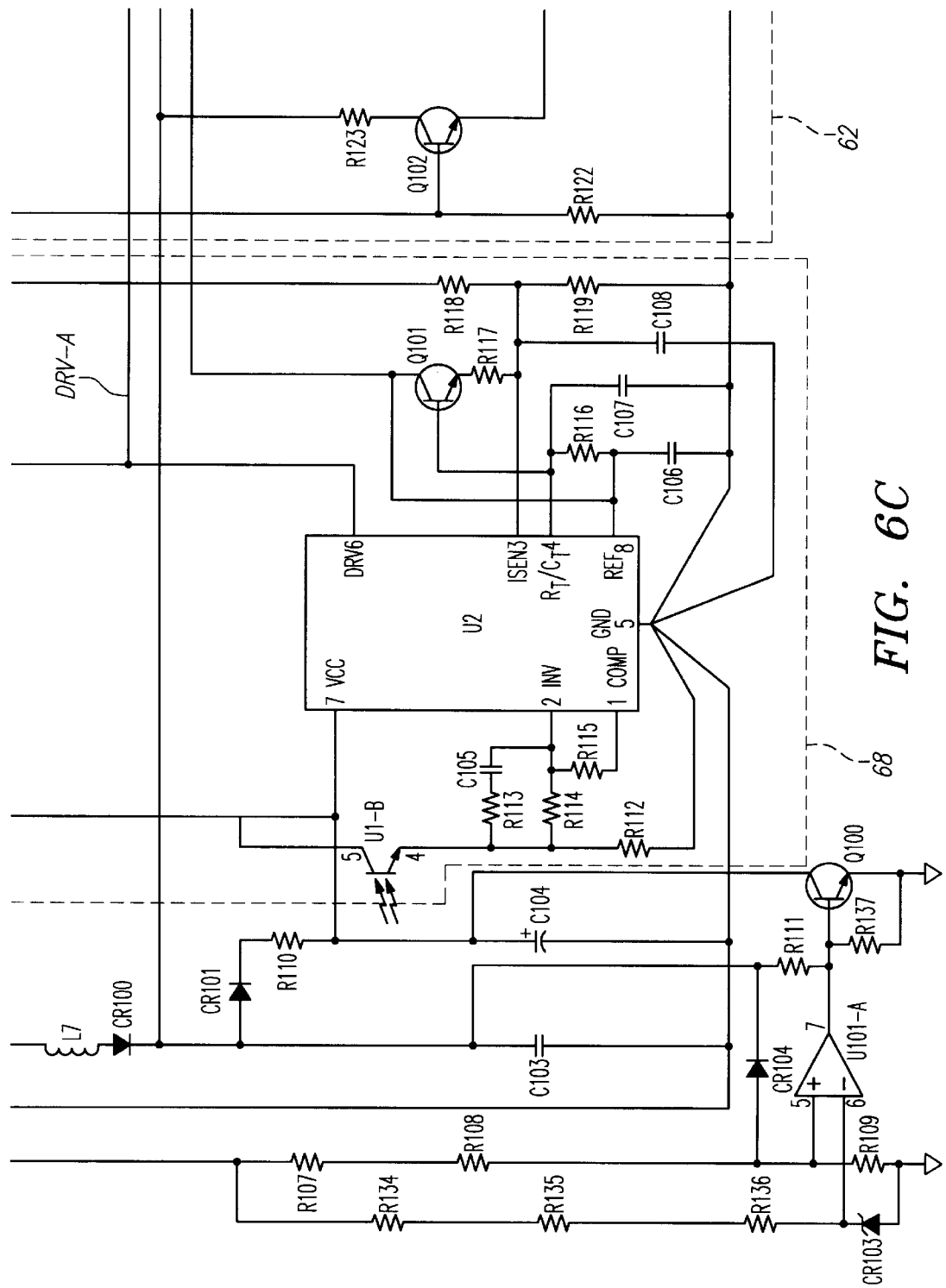
Figure 6D:
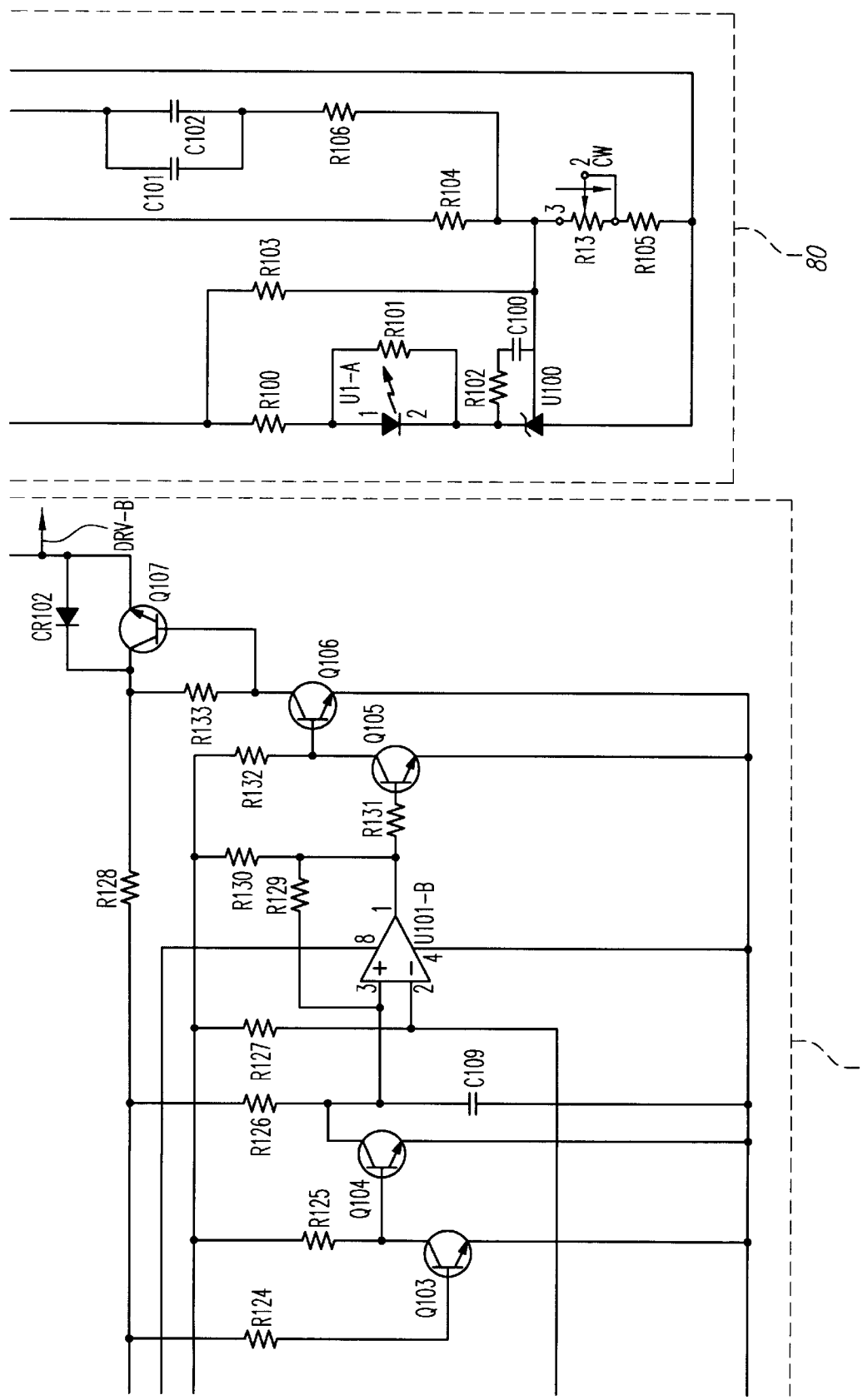

A block diagram showing the integration of a power factor corrector and an SMPS is illustrated in FIG. 6 according to a specific embodiment. The DSP² circuit 62, which controls the power factor corrector, is shown as a dotted-line block 62 that includes various component circuitry. The power stage of the power factor corrector is shown as a dotted-line block 82 that incorporates an inductor L3, a switch Q1, a resistor R14, a diode CR4, and a capacitor C9. The controller 68 for the SMPS is shown as a dotted-line block 68 that includes various component circuitry. A power stage and a feedback mechanism of the SMPS are denoted, respectively, by dotted-line blocks 84 and 80, each of which include various component circuitry.

The feedback mechanism 80 of the SMPS can be achieved by optical, magnetic, or other means known to those skilled in the art and advantageously provides electrical isolation from the AC line to the user circuitry. The DSP² circuit 62, as discussed above, comprises the elements included within the dotted-line block denoted 62. The control signal for the switch Q1 is generated by the DSP² circuit 62 and designated DRV-B.

A comparator U101-B within the DSP² circuit 62 includes a hysteresis resistor network comprising first and second resistors R130, R129. The comparator U101-B has three ports: a positive input, a negative input, and an output. When the positive input is greater than the negative input, the output of the comparator U101-B is in an open-collector, high-impedance state. When the negative input is greater than the positive input, the output of the comparator U101-B is in a low-impedance state. The comparator U1lo-B may be implemented with any of a variety of circuits known in the art such as, e.g., an op-amp, a differential pair, etc.

A ramp generator within the DSP² circuit 62 includes first and second transistors Q103, Q104, a capacitor C109, and a resistor R126. The transistors Q103, Q104 may be implemented with MOSFETs, JFETs, BJTs, or any other conventional transistor known in the art. The ramp is derived from the SMPS gate drive signal DRV-A. The ramp waveform may be a sawtooth signal, or alternatively, a nonlinear signal such as, e.g., an exponential waveform or a parabolic waveform. The ramp charges when the gate drive is on. Thus, the capacitor C109 is charged through the resistor R126, forming the ramp generator. The ramp is reset to zero each cycle when the gate drive from the SMPS is terminated via turn off of the transistor Q103 and turn on of the transistor Q104. The ramp signal is fed to the positive input of the comparator U101-B, as shown also in FIG. 14B, which illustrates the ramp generator signal as a function of time.

A voltage reference is advantageously formed by a reference signal that is generated by the controller 68 of the SMPS through a resistor R127, which is connected to the negative input of the comparator U101-B. Thus, the voltage reference signal is compared with the ramp generator signal, as shown also in FIG. 14B.

The AC voltage preferably varies as a function of the input line voltage. The AC line voltage is rectified and sensed via first and second diodes CR1, CR2 and first, second, and third resistors R117, R118, R122. The rectified AC voltage is buffered with an emitter follower stage comprising a transistor Q102 and the resistor R123. The output of the buffer is injected into the negative terminal of the comparator U101-B and summed with the reference voltage via the resistor R127, providing a reference that is proportional to the line voltage with a DC bias. The transistor Q102 may be implemented with a MOSFET, JFET, BJT, or any other conventional transistor known in the art.

A transistor Q107, first and second resistors R128, R133, and a diode CR102 form the drive signal DRV-B for the switch Q1, which may be analogous to the switch S1 of FIG. 4. The diode CR102 is preferably configured anti-parallel to the transistor Q107. The transistor Q107 may be implemented with a MOSFET, JFET, BJT, or any other conventional transistor known in the art. Likewise, the various diodes and resistors herein discussed may be implemented with any convenient off-the-shelf components. When the SMPS drive signal DRV-A is activated, the switch Q1 is turned on after a delay time has elapsed. The turn on of the switch Q1 occurs when the ramp signal on the positive terminal of the comparator U101-B is greater than the reference signal on the negative input of the comparator U101-B. Advantageously, the power factor corrector is controlled so as to minimize the power processing requirement and allow for a lit variable bus voltage. When the drive signal DRV-A for the SMPS is inhibited, turn off of the switch Q1 occurs via the diode CR102 and the resistor R133.

The drive signal DRV-B to the switch Q1 is preferably controlled by the state of the comparator U101-B and is influenced by first and second transistors Q105, Q106 and first, second, third, and fourth resistors R130, R131, R132, R133. The transistors Q105, Q106 may be implemented with MOSFETs, JFETs, BJTs, or any other conventional transistor known in the art. If the comparator U101-B is in a high-impedance state, the first transistor Q105 is on, and the second transistor Q106 is turned off. The transistor Q107 is thus on, causing the switch Q1 to be enabled. If the comparator U101-B is in a low-impedance state, the transistor Q105 is off, the transistor Q106 is on, and the transistor Q107 is off, turning the switch Q1 off.

In a particular embodiment, the controller 68 for the SMPS generates a power switch drive output that is a function of the load on the SMPS and the input voltage to the SMPS. The controller 68, which is designated as a dotted-line block 68, is preferably a pulse width modulated (PWM) input stage for the SMPS. The SMPS controller 68 includes a control IC U2 and peripheral circuitry. The control IC U2 may be implemented with any of a large number of generic, frequency controllers currently available on the market. Similarly, as those skilled in the art would readily comprehend, the power stage 84 for the SMPS may be of any type that is available.

In operation, whenever the switch Q1 is switching, the boost converter circuit is active. The drive for the switch Q1 is modulated by the DSP² circuit 62. As illustrated in FIGS. 12 and 13A–C, the modulation of the switch Q1 determines the wave shape of the line current that the boost converter circuit is drawing from the AC source.

Figure 12:
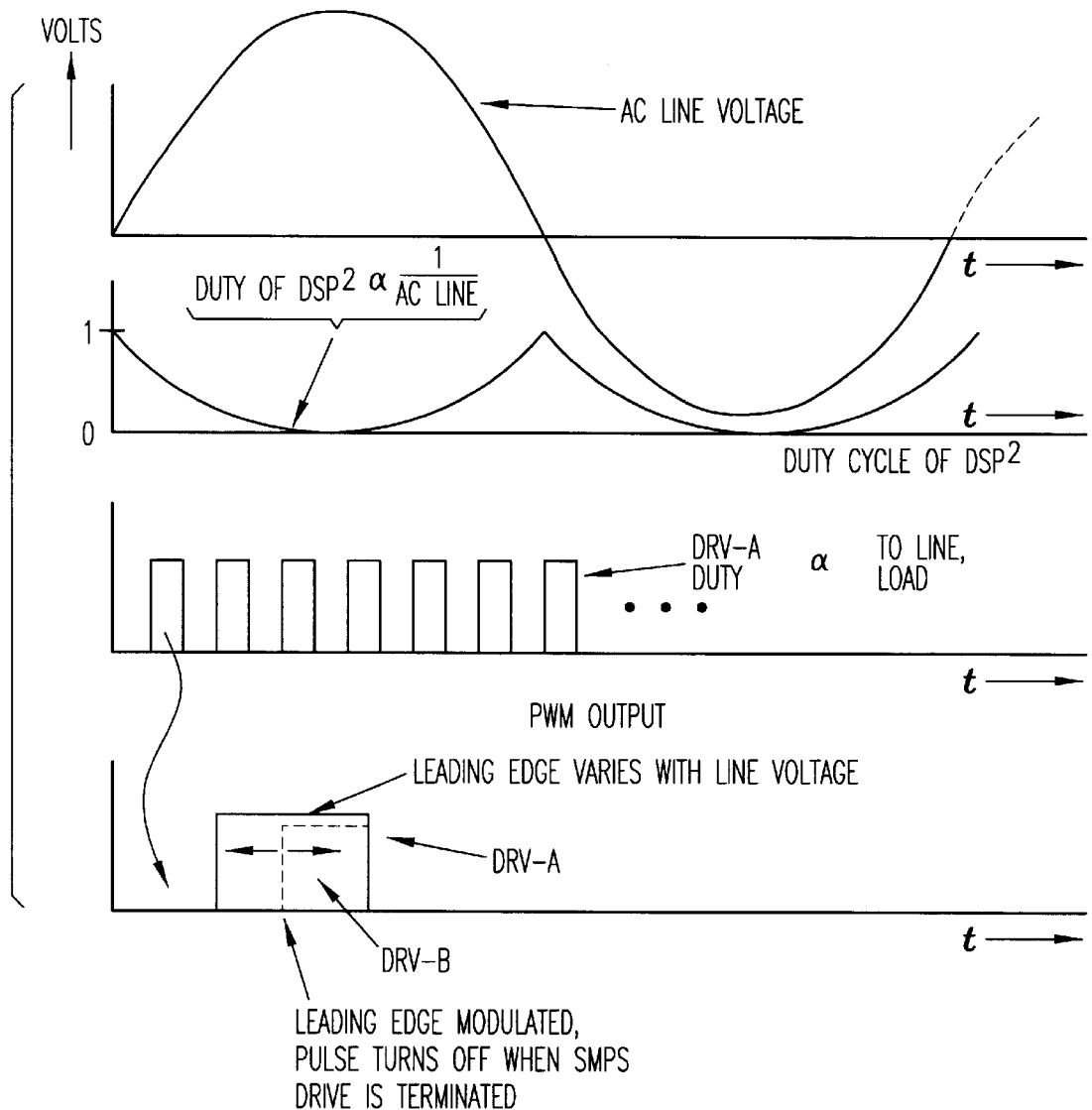
FIG. 12 is a timing diagram illustrating duty cycle variation with AC line voltage.
Figure 13A:
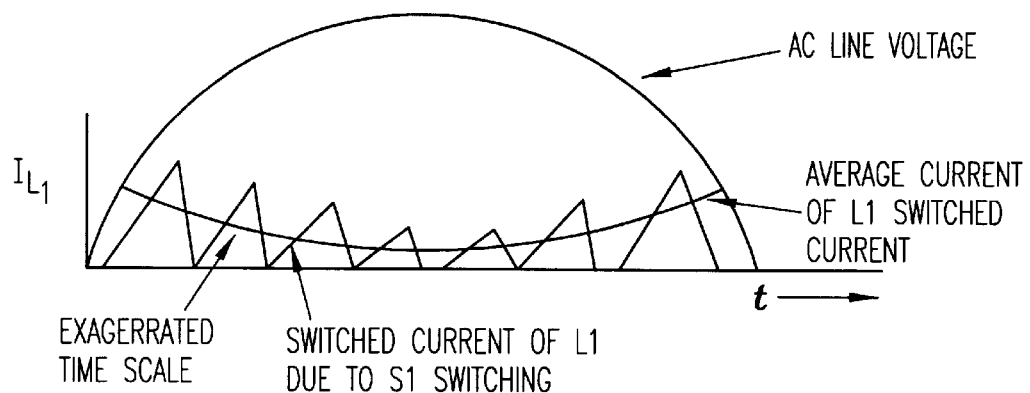
FIGS. 13A–C are graphs illustrating various components of AC line current versus time in contrast to AC line voltage.
Figure 13B:
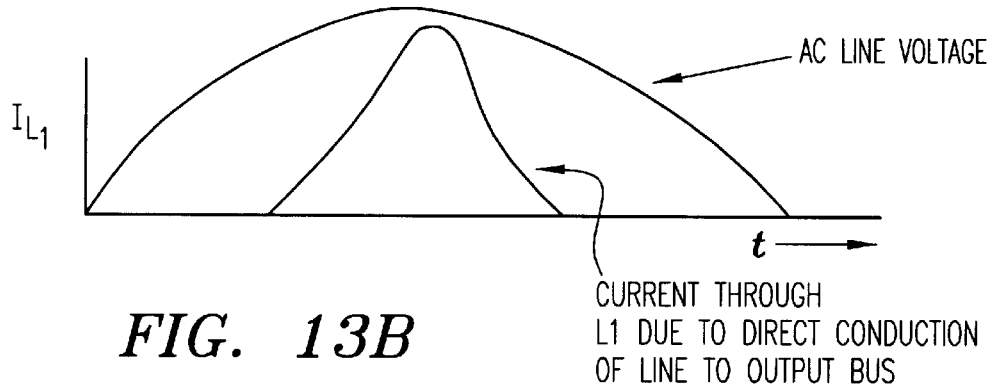
Figure 13C:
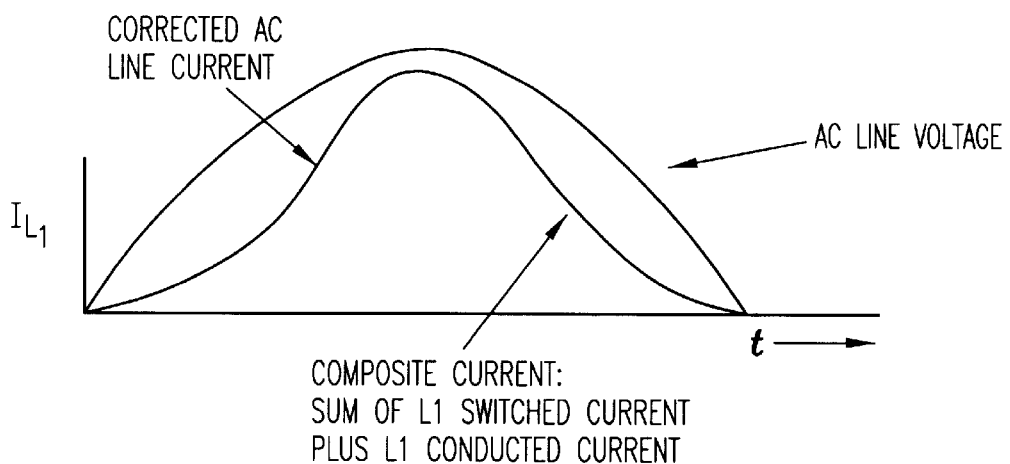

The duty cycle is inversely proportional to the AC line voltage, as illustrated in FIG. 12. The SMPS duty cycle, however, is constant, and is leading-edge modulated by the DSP² circuit 62, as shown in FIG. 12. The graphs of FIGS. 13A–C illustrate the current averaging of the boost converter switch current by a generic EMI filter. When the boost converter circuit is inactive, i.e., when the switch Q1 is not switching, the power for the SMPS is fed directly through the inductor L1 and the diode CR1 (see FIG. 4). The averaged, switched current and the direct conduction of current through the inductor L1 and the diode CR1 sum together to form the total AC line current, as shown in FIGS. 13A–C. The graph of FIG. 13C depicts the total current being drawn from the line.

The modulation of the switch Q1 is advantageously controlled to achieve reduced line current harmonics. This is preferably accomplished by modulating the duty cycle of the switch Q1 inversely proportional to the AC line.

Figure 14A:
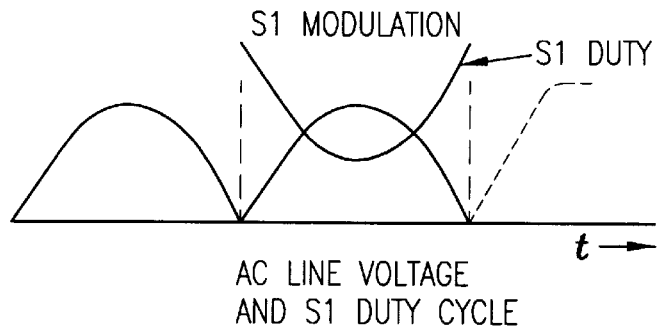
FIG. 14A is a graph of switch duty cycle and AC line voltage versus time.
Figure 14B:
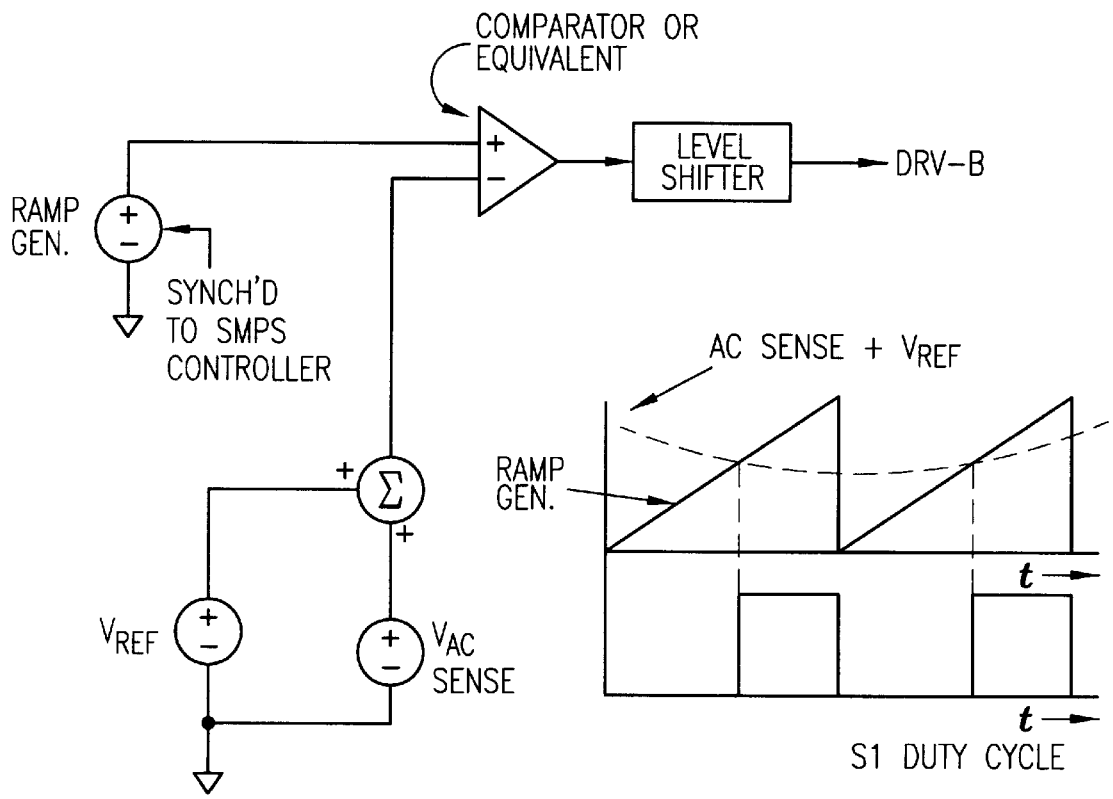
FIG. 14B is a block diagram of a circuit that uses a dual-input comparator to generate a DRV-B signal and accompanying graphs of the dual input voltages to the comparator versus time.

With reference to FIGS. 14A–B, modulation of the switch Q1 over one switching cycle is preferably accomplished in the following manner: The gate drive signal DRV-A from the SPMS controller 68 is enabled to begin the next switching cycle of the SMPS. The SMPS gate drive DRV-A activates the ramp generator. The output of the comparator U101-B is in the low-impedance state, which inhibits the drive signal DRV-B to the switch Q1. The low-impedance state is maintained until the ramp voltage on the positive input to the comparator U101-B exceeds the voltage on the negative input to the comparator U101-B, at which time the output of the comparator U101-B transitions to a high-impedance state.

When the output of the comparator U101-B is in the high-impedance state, the transistor Q105 is on, the transistor Q106 is off, and the transistor Q107 is on; therefore, the switch Q1 is enabled. The "on" time for the switch Q1 is determined by the time that is required for the capacitor C109 to charge to the amplitude of the negative input of the comparator U101-B, which comprises the sum of two components: a fixed reference voltage, and a voltage that is proportional to the peak of the AC voltage line. The longer the time required for the capacitor C109 to reach the reference voltage, the shorter will be the drive pulse to the switch Q1. Thus, the boost effect is reduced and the power processing requirement is minimized for the power factor corrector.

At the completion of a switching cycle of the SMPS control circuit 68, the output of the comparator U101-B transitions low, turning the transistor Q105 off, the transistor Q106 on, and the transistor Q107 off. This results in termination of the drive signal DRV-B to the switch Q1. The diode CR102 is advantageously configured anti-parallel to the transistor Q107 to provide a discharge current path for the drive signal DRV-B of the switch Q1.

As the AC line voltage is increased, more voltage is injected into the negative input of the comparator U101-B, resulting in a longer charge time for the capacitor C109 to reach the reference voltage and enable the switch Q1. This results in a lower duty cycle for the switch Q1 for an increase in the line voltage. Thus, the particular control algorithm herein disclosed allows the boost converter to process power mainly at the beginning and end of each cycle, resulting in minimum power dissipation and lower EMI, as shown in FIGS. 12 and 14A.

Figure 15:
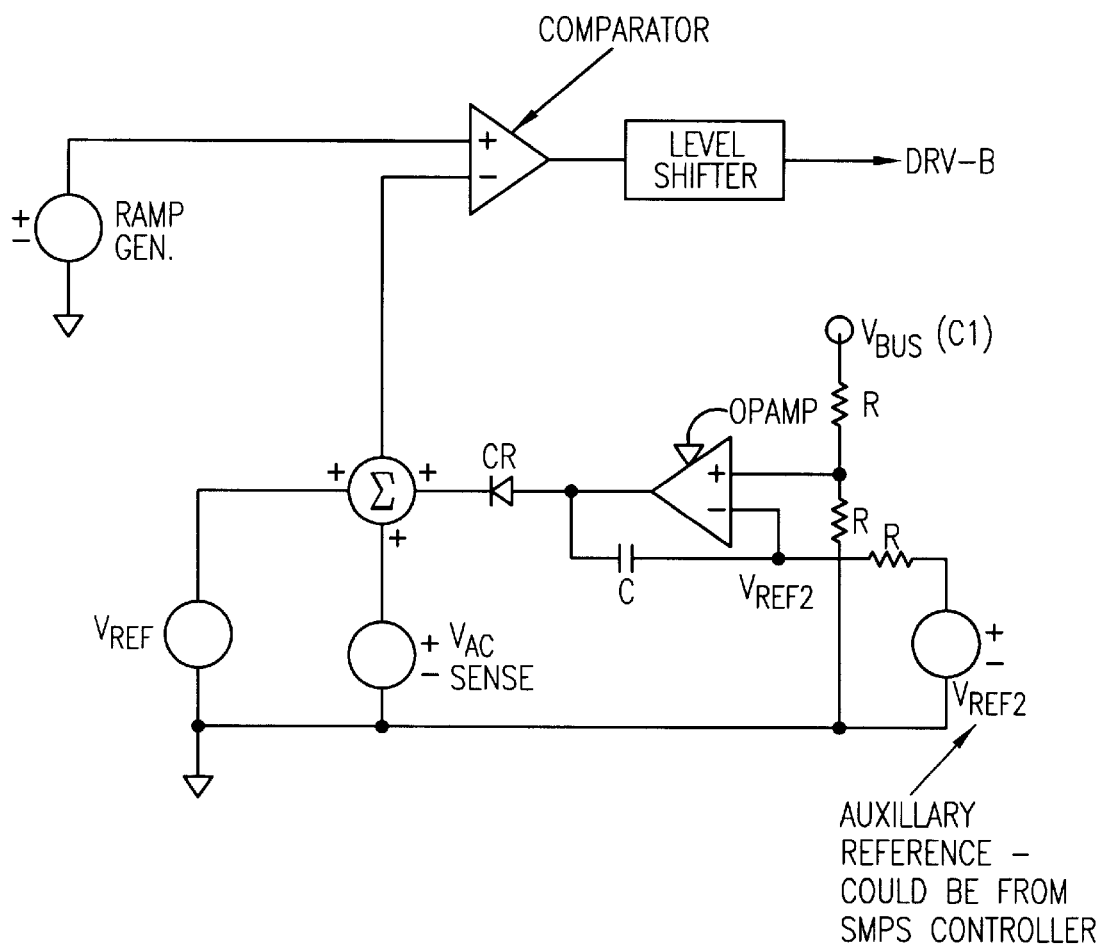
FIG. 15 is a block diagram of a circuit that can be used for over voltage protection in a power factor corrector.

At abnormally high AC line voltages, or under certain SMPS load transients, the bus capacitor Cl of the DSP$^2$ circuit 62 (see FIG. 4) may experience excessive voltage due to the operation of the boost converter circuit 60. Advantageously, the bias power to the SMPS controller 68 can be turned off via a comparator U101-A (see FIG. 6). The bus voltage is sensed via first, second, and third resistors R107, R108, R109. A reference voltage is generated via fourth, fifth, and sixth resistors R134, R135, R136 and a diode CR103. When the bus voltage exceeds the reference voltage, the comparator U101-A is driven high, thereby turning on a transistor Q100 via seventh and eighth resistors R111 and R137. The transistor Q100 disables the bias to the SMPS control IC U2. Alternatively, as illustrated in FIG. 15, an operational amplifier (op-amp) may advantageously be used to achieve quasi-linear regulation at abnormally high AC line voltages. The op-amp senses the bus voltage $V_{C1}$ and forces the boost converter off by injecting a large feedback signal into the ramp reference, thereby rendering it impossible for the ramp generator signal to reach the threshold voltage. Thus, the boost converter switch Q1 (see FIG. 6) is never activated and no boosting occurs. The SMPS, however, continues to operate. As one of skill in the art would readily appreciate, the choice of which implementation to use for over voltage protection depends upon the desired end application of the power factor corrector.

Preferred embodiments of the present invention have thus been shown and described. It would be apparent to one of ordinary skill in the art, however, that numerous alterations may be made to the embodiments herein disclosed without departing from the spirit or scope of the invention. Therefore, the invention is not to be limited except in accordance with the following claims.

What is claimed is:

1. A power factor corrector capable of being used in conjunction with a PWM power supply controller, said power factor corrector comprising:
   a power stage including a switch; and
   a signal processor electrically coupled to said power stage and said PWM power supply controller, said signal processor configured to receive
      a rectified AC voltage signal from said power stage, and
      a gate drive signal from said PWM power supply controller, said signal processor generating a ramp voltage signal synchronized with the gate drive signal, and processing the received signals into an output signal that modulates said switch.

2. The power factor corrector of claim 1, wherein said signal processor comprises a comparator configured to receive the rectified AC voltage signal at a first input and the ramp voltage signal at a second input, said comparator configured to generate an output signal to drive said switch, thereby minimizing the power processed by said power factor corrector.

3. The power factor corrector of claim 2, further comprising a resistor network and a plurality of interconnected transistors, said comparator being electrically coupled to said resistor network and said plurality of interconnected transistors to drive said switch thereby.

4. The power factor corrector of claim 1, further comprising a ramp generator to produce the ramp voltage signal from the drive signal, and wherein the rectified AC voltage signal is derived from an input AC voltage signal summed with a DC bias reference voltage signal, the power processed by said power factor corrector decreasing as the input AC voltage signal increases in amplitude.

5. The power factor corrector of claim 4, wherein said ramp generator comprises a plurality of electrically coupled resistors and transistors.

6. The power factor corrector of claim 1, further comprising an emitter follower stage to buffer the rectified AC voltage signal.

7. The power factor corrector of claim 6, wherein said emitter follower stage comprises a resistor electrically coupled to a transistor.

8. A method of reducing harmonics with a power factor corrector capable of being used in conjunction with a PWM power supply controller that provides a gate drive signal, the power factor corrector receiving as input an AC voltage signal, said method comprising the steps of:
   producing a ramp voltage signal from the gate drive signal;
   comparing a AC voltage signal with the ramp voltage signal;
   enabling a switch when the ramp voltage signal level exceeds the rectified AC voltage signal level;

synchronizing the ramp voltage signal to the gate drive signal; and disabling the switch synchronously to the gate drive signal.

9. The method of claim 8, further comprising the step of summing the AC rectified voltage signal with a DC bias reference voltage signal during performance of said comparing step.

10. The method of claim 8, further comprising the steps of deriving the rectified AC voltage signal from an AC line voltage signal and allowing an output DC bus voltage signal to vary with the AC line voltage signal and AC line power.

11. The method of claim 10, further comprising the step of processing a percentage of power that decreases as the amplitude of the AC line voltage signal increases.

12. The method of claim 10, further comprising the step of varying duty cycle of the power factor corrector such that the duty cycle is inversely proportional to instantaneous AC line voltage.

13. The method of claim 10, further comprising the step of controlling the power factor corrector to process a relatively small percentage of power required by a load.

14. The method of claim 10, further comprising the step of controlling the power factor corrector to process power required by a load such that the power is shared between a boost converter circuit and an AC line, with a relatively small percentage of the power being derived from operation of the boost converter circuit.

15. The power factor corrector of claim 4, wherein said DC bias reference voltage signal is derived from said power supply.

16. The method of claim 8, wherein said step of producing includes using a ramp generator to produce the ramp voltage signal from the drive signal.

17. The method of claim 9, wherein said DC bias reference voltage signal is derived from said power supply.

* * * * *

UNITED STATES PATENT AND TRADEMARK OFFICE
CERTIFICATE OF CORRECTION

PATENT NO. : 6,104,172
DATED : August 15, 2000
INVENTOR(S): Josephs et al.

It is certified that error appears in the above-identified patent and that said Letters Patent are hereby corrected as shown below:

Column 1, line 63, change "that to", to --that--.

Column 5, line 30, change "U11o-B", to --U101-B--.

Signed and Sealed this

Fifteenth Day of May, 2001

*Attest:*

NICHOLAS P. GODICI

*Attesting Officer*  *Acting Director of the United States Patent and Trademark Office*